Sept. 27, 1955   J. D. MINER, JR   2,719,259
REGULATING SYSTEM FOR ALTERNATING CURRENT GENERATORS
Filed March 29, 1952
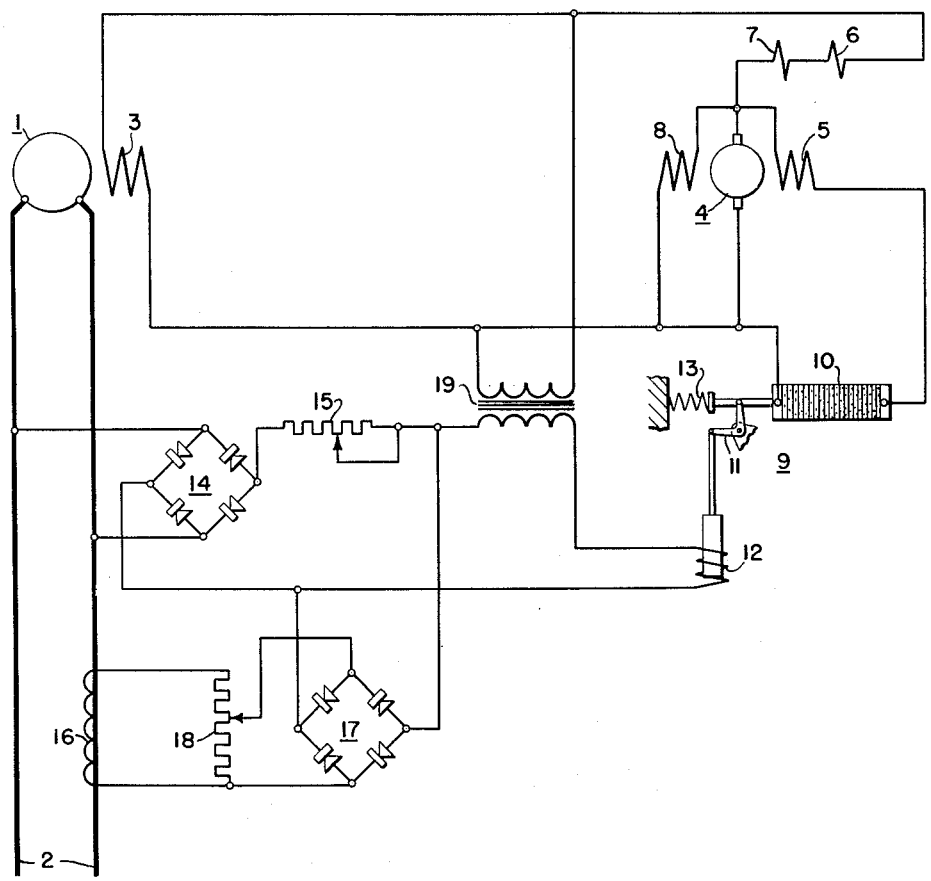
WITNESSES:
John E. Hensley
Jno. C. Groome
INVENTOR
John D. Miner, Jr.
BY
ATTORNEY United States Patent Office 2,719,259
Patented Sept. 27, 1955

2,719,259

REGULATING SYSTEM FOR ALTERNATING CURRENT GENERATORS

John D. Miner, Jr., Lima, Pa., assignor to Westinghouse Electric Corporation, East Pittsburgh, Pa., a corporation of Pennsylvania Application March 29, 1952, Serial No. 279,391

9 Claims. (Cl. 322—25)

The present invention relates to a regulating system for alternating-current generators and, more particularly, to a system for controlling the excitation of an alternating-current generator to prevent excessive transient overvoltages upon removal of a short-circuit and to prevent excessive short-circuit currents.

The regulating system of the present invention is particularly useful in connection with alternating-current generators for aircraft use designed for operation over a wide speed range, although it will be obvious that its usefulness is not restricted to this particular application. Alternating-current generators used on aircraft are usually driven directly from a main engine of the airplane, and such generators are frequently designed for operation over a wide range of speeds to supply variable frequency alternating current to loads on the airplane which are not substantially affected by frequency variation, such as heating and lighting loads and certain types of electronic equipment. The use of such a variable frequency system makes possible a very material saving in weight, since it eliminates the necessity for a constant-speed drive between the generator and the airplane engine, which is required for constant frequency.

Alternating-current generators of this type are usually provided with direct-current excitation by means of an exciter, which is a small, self-excited, direct-current shunt generator driven from the alternator shaft and preferably integral with the alternator. The output voltage of the alternating-current generator is controlled by a voltage regulator, usually of the carbon-pile type, which senses the alternating-current output voltage and varies the resistance of the shunt field circuit of the exciter to control the exciter voltage, so as to give the proper alternator field current to maintain the desired output voltage. With such a regulating system, if a short circuit occurs on the output circuit of the alternator, so that the voltage drops to substantially zero or close to zero, the regulator attempts to maintain the normal voltage and reduces the resistance in the exciter field circuit to its minimum value, so that the exciter voltage is increased to its maximum or ceiling value. If the alternator and exciter are running at a relatively high speed when this occurs, the ceiling voltage of the exciter may be high enough to cause flash-over of the exciter commutator. Even if no flash-over occurs, the high alternator field current causes an excessively high short-circuit current in the alternator, even if it is designed so that the short-circuit current at the minimum rated speed is barely high enough to insure blowing of fuses or operation of other protective devices.

When the short-circuit is removed, with the alternator and exciter running at high speed, and with the exciter voltage at its ceiling value, the alternator field current is many times its normal value, and the voltage regulator is in a position where it cannot start to act to control the alternator voltage until the voltage rises and passes through, or approaches, its normal value. Before the voltage regulator can act, therefore, the high alternator field current and the high exciter voltage cause the alternator voltage to rise to a very high value, which may be in excess of 250% of the normal voltage, before the regulator can act to reduce the exciter voltage and bring the alternator voltage again under control. This very high transient overvoltage upon the removal of a short-circuit is extremely undesirable, and in most cases cannot be tolerated, since it is high enough to cause serious damage to electronic equipment supplied by the alternator, and possibly also to other equipment connected to the system. The very high short-circuit currents which occur with this conventional regulating system are also extremely undesirable.

The principal object of the present invention is to provide a regulating system for alternating-current generators which will prevent excessive transient overvoltages upon removal of a short circuit, and which will limit the short-circuit current in the generator to a desired value.

Another object of the invention is to provide a regulating system for an alternating-current generator provided with a direct-current exciter in which the exciter voltage is controlled during a short circuit so that the generator field current rises only to a high enough value to give the desired short-circuit current, thus limiting the field current and preventing excessive transient overvoltage upon removal of the short circuit.

A further object of the invention is to provide a regulating system for an alternating-current generator provided with a direct-current exciter in which the voltage of the exciter is controlled in response to the output voltage of the alternating-current generator under normal conditions, and is controlled in response to the current of the generator under conditions such as a short circuit when the generator voltage is abnormally low.

Other objects and advantages of the invention will be apparent from the following detailed description, taken in connection with the accompanying drawing, the single figure of which is a schematic diagram showing a preferred embodiment of the invention.

The invention is shown in the drawing applied to the regulation of an alternating-current generator 1, which is shown as a single-phase alternator, and which may be driven by any suitable prime mover, such as a main engine of an airplane. The alternator 1 may be designed for operation over a wide speed range to supply variable frequency alternating current to a load circuit 2, although the invention is not limited to the control of generators of this particular type. The alternator 1 is provided with a field winding 3, and field excitation is supplied by an exciter 4 which is connected directly to the alternator field winding 3. The exciter 4 is a small direct-current generator which is preferably driven from the shaft of the alternator 1 and which may be built integrally with the alternator. The exciter 4 may be of any suitable type and is shown as being a shunt-wound generator having a main shunt field winding 5 connected across the armature, and interpole and compensating windings indicated as a single series winding 6. The exciter 4 is also shown as having a series stabilizing winding 7 for the purpose of preventing polarity reversal of the exciter under certain transient and fault conditions, together with a differentially connected shunt field winding 8 which neutralizes the effect of the series winding 7 under normal conditions but permits it to become effective under conditions when a tendency to polarity reversal exists. The purpose and effect of the stabilizing windings 7 and 8 are more fully disclosed and claimed in a copending application of R. P. Judkins, Serial No. 252,643, filed October 23, 1951.

The output voltage of the alternator 1 is controlled by means of a voltage regulator 9, which is shown as being of the carbon-pile type. The regulator 9 includes a carbon pile 10, or other variable resistance, which is connected in series in the circuit of the main shunt field winding 5 of the exciter. The resistance of the carbon pile 10 is varied by means of a pressure mechanism 11, of any suitable type, which is controlled by an actuating coil 12 acting in opposition to a spring 13. It will be seen that varying the energization of the coil 12 varies the resistance in the exciter field winding circuit and thus controls the field current of the exciter, which determines the output voltage of the exciter and therefore the alternator field excitation and alternator voltage.

The actuating coil 12 of the voltage regulator 9 is energized by one or the other of two signal voltages, one of which is derived from the output voltage of the alternator and the other from the output current. The first of these signal voltages is obtained from a single-phase rectifier bridge 14, which may be connected directly across the output circuit 2 of the alternator 1 so that the rectified output voltage of the rectifier is proportional to the alternator voltage. It will be obvious that if necessary or desirable the rectifier bridge 14 could be energized from a potential transformer connected across the alternator voltage or could be energized in any other desired manner by a voltage equal or proportional to the alternator voltage. A rheostat 15 is connected in series with the output voltage of the rectifier 14 to adjust the voltage setting of the regulator to maintain the desired alternator voltage. The rectified signal voltage obtained from the rectifier bridge 14 is connected directly to the actuating coil 12 of the voltage regulator 9.

A second signal voltage is obtained from a current transformer 16, which is connected to a rectifier bridge 17 so that the output voltage of the rectifier 17 is proportional to the alternator current. A variable resistor or potentiometer 18 is connected between the current transformer 16 and the rectifier 17 to adjust the current setting of the regulator. The rectified output voltage of the rectifier bridge 17 is connected to the actuating coil 12 of the voltage regulator 9 in parallel with the signal voltage obtained from the rectifier bridge 14. A damping transformer 19 is preferably also provided to improve the stability of the system, and is shown as being connected in the usual manner with its primary winding across the exciter voltage and its secondary winding connected in series in the circuit of the actuating coil 12 of the voltage regulator.

It will be seen that two independent signal voltages are provided in the system, one being proportional to the alternator output voltage and the other proportional to the alternator current, and that these two signal voltages are both applied to the actuating coil 12 of the voltage regulator 9. The two rectifier bridges from which these voltages are obtained, however, are connected to the coil 12 in parallel, and because of the blocking characteristics of the rectifiers, current cannot flow from both of them through the coil 12 at the same time if the voltages are different. The effect of this connection, therefore, is that the coil 12 is energized by whichever one of the signal voltages is the higher and the other signal voltage has no significant effect.

In normal operation, with the alternator 1 running at a speed within its normal range and with normal load current, the signal voltage corresponding to the current will be relatively low and the signal voltage corresponding to the alternator voltage will be higher, so that the coil 12 will be energized in response to the generator voltage and will actuate the voltage regulator 9 to maintain the desired normal alternator output voltage by varying the resistance in the exciter shunt field circuit. If a short circuit occurs on the load circuit 2 while the alternator 1 is in operation, the alternator voltage will collapse to a very low value, usually approaching zero, and the current will rise considerably in excess of its normal value. If the regulator 9 were actuated only in response to generator voltage, as in the conventional arrangement, the regulator would act to reduce the resistance 10 to its minimum value, so that the voltage of the exciter 4 would rise to its ceiling value with resulting danger of flash-over of the exciter, and with excessive short-circuit current in the alternator and excessive transient overvoltage upon removal of the short circuit, as previously explained.

In the system of the present invention, however, when a short circuit occurs, since the alternator voltage collapses to nearly zero and the current rises, the signal voltage proportional to the current, derived from the rectifier bridge 17, becomes larger than the signal voltage proportional to the alternator voltage. During the existence of the short circuit, therefore, the coil 12 of the regulator 9 is energized in response to the alternator current, and the resistance 18 is set to maintain the short-circuit current at the desired value, which may be, for example, from 200 to 300 per cent of rated full load current to insure blowing of fuses or operation of other protective devices. The regulator 9, therefore, will permit the exciter field current to rise only enough to give the required alternator field excitation to obtain this short-circuit current, and the exciter voltage will be kept well below its ceiling value so that danger of exciter flash-over is prevented. When the short circuit is removed, the alternator field current, while above its normal range of values, will not be excessively high and the transient overvoltage which occurs will be relatively low and will not reach the dangerously high magnitudes which were unavoidable with conventional regulating systems.

As soon as the alternator voltage rises after a short circuit has been cleared, the signal voltage derived from the rectifier bridge 14 increases and again becomes larger than the signal voltage derived from the rectifier bridge 17, so that the regulator is again actuated in response to the alternator voltage and functions to maintain the desired voltage as before. Since the regulator has been maintained in normal regulating position during the short circuit, it is in position to operate rapidly as soon as the fault is cleared and the alternating voltage starts to rise, so that the action of the regulator to control the overvoltage is almost instantaneous. Thus, the transient overvoltage following the short circuit is kept to a very short duration as well as a low magnitude. It will be seen that the operation of the system, in general, is to control the exciter voltage in response to the alternator output voltage under normal conditions, but under short-circuit conditions when the alternator voltage becomes abnormally low, the exciter voltage is controlled in response to the alternator current to limit the short-circuit current of the alternator, and to prevent excessive rise in the exciter voltage with its resulting danger of exciter flash-over and excessive transient overvoltages.

It should now be apparent that a relatively simple but effective regulating system has been provided for alternating-current generators which operates to prevent dangerously high transient overvoltages upon removal of a short circuit, and which limits the short-circuit current of the generator to any desired value during the existence of the short circuit. A preferred embodiment of the invention has been shown for the purpose of illustration, but it will be understood that various modifications and other embodiments are possible and that the invention is applicable to other types of alternators. Thus, although a single-phase alternator has been shown, the regulating system may equally well be applied to three-phase alternators.

Since various modifications and other embodiments are possible, it is to be understood that the invention is not limited to the particular detailed arrangement shown and described, but in its broadest aspects it includes all equivalent embodiments and modifications which come within the scope of the appended claims.

I claim as my invention:

1. In combination, an alternating-current generator, a direct-current exciter for said generator having a field winding, regulating means for controlling the current in the exciter field winding, means for deriving a signal voltage proportional to the output voltage of the generator, means for deriving a signal voltage proportional to the output current of the generator, and means for directly controlling the operation of said regulating means only in response to whichever one of said signal voltages is the higher.

2. In combination, an alternating-current generator, a direct-current exciter for said generator having a field winding, regulating means for controlling the current in the exciter field winding, means for deriving a signal voltage proportional to the output voltage of the generator, means for deriving a signal voltage proportional to the output current of the generator and means for applying said signal voltages directly to said regulating means to effect control of the regulating means only by whichever one of the signal voltages is the higher.

3. In combination, an alternating-current generator, a direct-current exciter for said generator having a field winding, regulating means for controlling the current in the exciter field winding, said regulating means including an actuating coil, means for deriving a signal voltage proportional to the generator output voltage, means for deriving a signal voltage proportional to the generator output current, and means for applying said signal voltages to the actuating coil of the regulating means to effect operation of the regulating means only in response to whichever of the signal voltages is the higher.

4. In combination, an alternating-current generator, a direct-current exciter for said generator having a field winding, regulating means for controlling the current in the exciter field winding, said regulating means including an actuating coil, a first rectifier connected across the generator output voltage, a second rectifier connected across a voltage proportional to the generator output current, and means for connecting the direct-current output voltages of said two rectifiers in parallel to the actuating coil of the regulating means.

5. In combination, an alternating-current generator, a direct-current exciter for said generator having a field winding, a voltage regulator for controlling the excitation of the generator, said voltage regulator including a variable resistance connected in the circuit of said exciter field winding and an actuating coil for effecting variation of said resistance, means for deriving a signal voltage from the generator output voltage, means for deriving a signal voltage from the generator output current, rectifier means for rectifying said signal voltages, and means for connecting the rectified signal voltages in parallel to the actuating coil of the voltage regulator.

6. In combination, an alternating-current generator, a direct-current exciter for said generator having a field winding, a voltage regulator for controlling the excitation of the generator, said voltage regulator including a variable resistance connected in the circuit of said exciter field winding and an actuating coil for effecting variation of said resistance, a first rectifier connected across the generator output voltage, a second rectifier connected across a voltage proportional to the generator output current, and means for connecting the direct-current output voltages of said two rectifiers in parallel to the actuating coil of the voltage regulator.

7. A regulating system for an alternating-current generator provided with a direct-current exciter having a field winding, said regulating system comprising a voltage regulator for controlling the current in the exciter field winding, said voltage regulator including an actuating coil, means for deriving a signal voltage proportional to the generator output voltage, means for deriving a signal voltage proportional to the generator output current, and means for applying said signal voltages to the actuating coil of the voltage regulator to effect operation of the voltage regulator only in response to whichever one of the signal voltages is the higher.

8. A regulating system for an alternating-current generator provided with a direct-current exciter having a field winding, said regulating system comprising a voltage regulator for controlling the current in the exciter field winding, said voltage regulator including an actuating coil, a first rectifier connected across the generator output voltage, a second rectifier connected across a voltage proportional to the generator output current, and means for connecting the direct-current output voltages of said two rectifiers in parallel to the actuating coil of the regulating means.

9. A regulating system for an alternating-current generator provided with a direct-current exciter having a field winding, said regulating system comprising a voltage regulator for controlling the current in the exciter field winding, said voltage regulator including an actuating coil, means for deriving a signal voltage from the generator output voltage, means for deriving a signal voltage from the generator output current, rectifier means for rectifying said signal voltages, and means for connecting the rectified signal voltages in parallel to the actuating coil of the voltage regulator.

References Cited in the file of this patent

UNITED STATES PATENTS 2,298,536   Logan _____ Oct. 13, 1942